W. H. BLAUVELT, C. G. TUFTS & C. A. COLLINS.
ART OF REMOVING TAR FROM COAL GASES.
APPLICATION FILED MAR. 3, 1911.
1,053,349.
Patented Feb. 18, 1913.
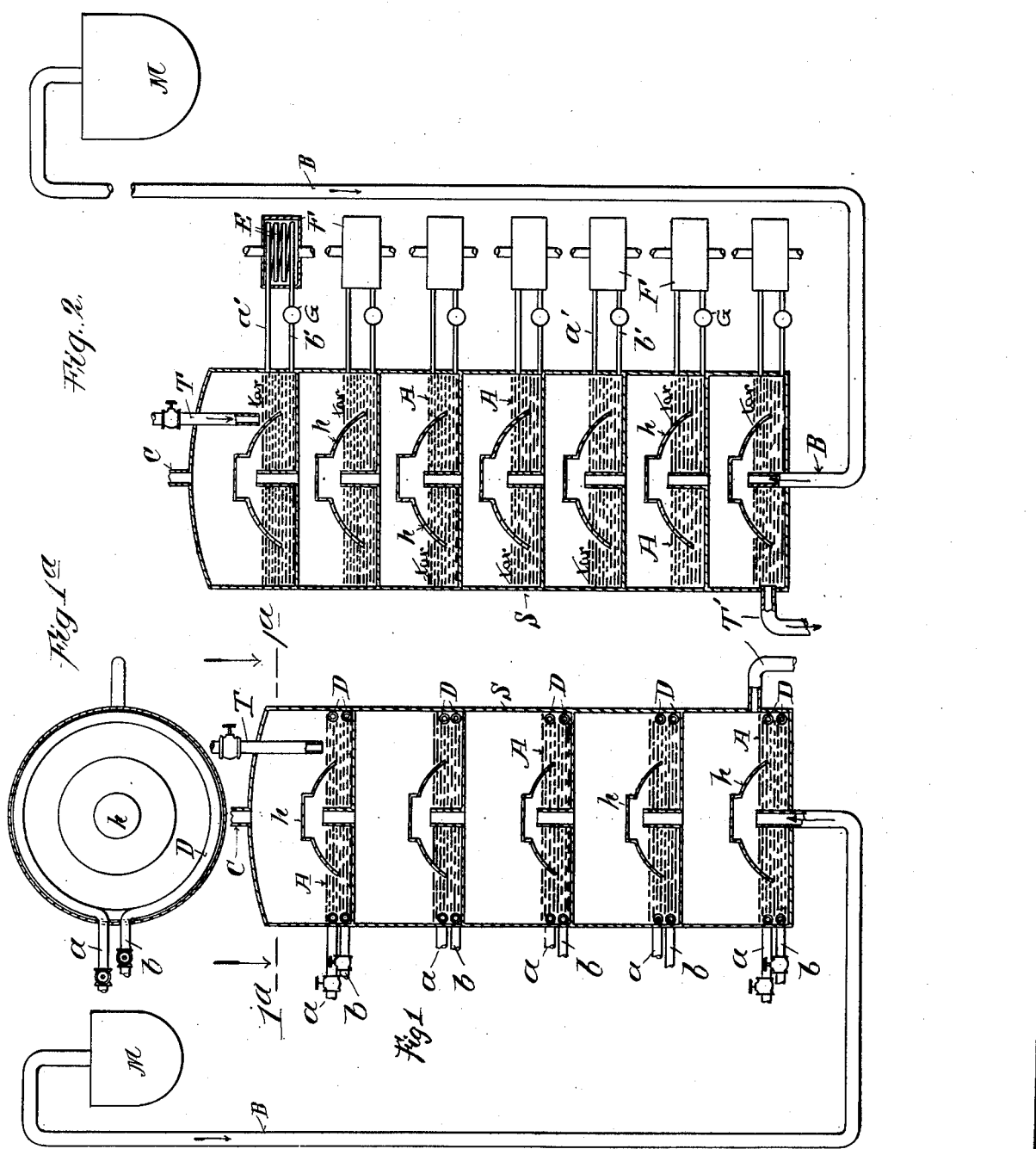

UNITED STATES PATENT OFFICE.

WILLIAM H. BLAUVELT AND CHARLES G. TUFTS, OF SYRACUSE, AND CLARKSON A. COLLINS, OF NEW YORK, N. Y., ASSIGNORS TO SEMET-SOLVAY COMPANY, OF SOLVAY, NEW YORK, A CORPORATION OF PENNSYLVANIA.

ART OF REMOVING TAR FROM COAL-GASES.

1,053,349.   Specification of Letters Patent.   Patented Feb. 18, 1913.

Application filed March 3, 1911. Serial No. 612,034.

*To all whom it may concern:*

Be it known that we, WILLIAM H. BLAUVELT and CHARLES G. TUFTS, of Syracuse, Onondaga county, and CLARKSON A. COLLINS, of the city and county of New York, in the State of New York, all citizens of the United States, have invented certain new and useful Improvements in the Art of Removing Tar from Coal-Gases, of which the following is a specification.

Heretofore it has been proposed to effect the removal from such gases of the tar carried in suspension thereby, prior to fixing the contained ammonia in an acid solution, by the use of liquid tar itself, by contact with which the tar carried in the gas is caught and held. In the successful carrying out of such a process the keeping of the gas and the scrubbing tar at proper temperatures is important, since, if the temperature is too high distillation of the tar used as a scrubbing agent will take place, whereby the tar carried by the gas will be added to rather than removed. If, on the other hand, the temperature of the gas falls too low condensation of the water vapor carried thereby will take place with consequent loss of ammonia. Within the permissible range of temperatures an approach to the lower is desirable since thereby the tar is more quickly and efficiently removed from the gas.

It has been proposed to effect the required regulation of temperature by maintaining a constant flow of tar at a uniform regulated temperature through the different parts of the scrubber and at the same time to regulate the temperature of the gas before it enters the scrubber. This involves not only the maintenance of a supply of tar sufficient to give a constant flow through the scrubber at the required temperature, but also the application of separate systems of heat regulation to the tar and gas.

In distinction from this our process involves the direct regulation of the temperature of the tar employed as a scrubber only. The hot gas to be scrubbed coming from the main in which it is collected, as from coke ovens, is brought into contact successively with a series of tar bodies, the temperature of each of which is independently regulated, so that the temperatures of the tar, and, consequently, of the gas coming in contact with the tar, are kept between the critical points, and neither distillation of the tar on the one hand, nor condensation of the water vapor of the gas on the other, can take place. In this manner a very exact heat regulation can be had with a minimum of operative manipulation, and with correspondingly desirable results in the product.

In the accompanying drawings we have shown diagrammatic representations of forms of apparatus which may be employed in carrying our invention into effect, though these may be largely modified in ways that will readily occur to those skilled in the art.

Figures 1 and 2 of the drawings show vertical sections of forms of such an apparatus; Fig. 1ª shows a horizontal section of the form of apparatus illustrated in Fig. 1.

Referring to the drawings, A. A. A. indicate a series of tar bodies which, in this instance, are shown as contained in the pans of a wash column or scrubber, S, of any usual or ordinary construction. The scrubber S is provided at the top with a tar inlet pipe, T, through which the supply of tar is admitted primarily to the several pans and through which additional tar may be introduced, if desired. Ordinarily, however, it is only necessary to provide the scrubber with an initial charge of tar which is not only maintained, but is increased by the tar removed from the gas, the overflow of which passes off from the lowermost pan through pipe T¹. The gas to be freed from tar, coming from the gas main, M, through pipe, B, enters the lowermost pan of the scrubber, S, under hood, $h$, by which it is compelled to pass downward and bubble up through the tar body A, and so on through each of the successive tar bodies until it escapes through pipe C.

Each of the tar bodies A is provided with a temperature regulating device which may, as shown in Fig. 1, consist simply of a pipe coil D, connected with inlet and exit pipes, $a$, $b$, through which flows a liquid, as water, of proper temperature. Since the gas may come from the gas main M at a temperature of about 110° C., and since such a temperature will cause the tar to distil, it is necessary that the tar in the lowermost pan of the scrubber S shall be somewhat cooled in order that it may not be raised to the distilling point by the heat of the incoming gas. This may be done by the flow of cold water of ordinary temperature through coil D, an undue reduction of temperature being prevented by properly adjusting the rate of flow by means of stop cocks in the pipes $a$, $b$.

The temperature of the gas must be so regulated that it will at no time fall below the point at which its water vapor will condense, usually about 80° C., and since the gas loses some portion of its heat by its contact with each of the successive tar bodies, if the temperature of these is kept at all below that of the passing gas, it may be necessary to warm the tar in the uppermost pans. In any case the necessary temperature and rate of flow of the heat regulating liquid can be readily ascertained by inspection.

Instead of using heat regulating coils within the tar bodies, as shown in Fig. 1, the temperature of these may be regulated by drawing off the tar from and returning it to each of them as by means of pumps indicated at G, and passing it through heat regulating coils E, which may be inclosed in boxes F, as shown in Fig. 2. The heat regulating coils E may, if desired and as the conditions may require, be subjected to the action of a cooling or heating fluid. Ordinarily, however, a sufficient degree of cooling will be produced by the radiation of heat from the coils E, these being properly proportioned in length to the size of the tar body employed.

While we have in the drawings shown the tar bodies as superposed in a column, it will be evident that this relative position is not essential to our process, nor is it essential to the removal of the tar from the gas that the gas shall be caused to bubble up through the tar since such removal can also be accomplished by bringing the gas in superficial contact with a series of tar bodies in the shape of thin sheets providing an extended surface for contact with the gas.

It will be evident that the conditions may be such that the temperature of the gas will not be so changed by contact with immediately successive tar bodies as to require the regulation of the temperature of each of the tar bodies employed, since some variation in the range of temperature is permissible, and in such case the temperature regulation will be applied to only as many of the successive tar bodies as conditions make necessary.

What we claim as new and desire to secure by Letters Patent is:

1. The hereinbefore described process of removing tar from gas, which consists in bringing the gas successively in contact with a series of tar bodies and independently regulating the temperature of the several tar bodies whereby the temperature of each of the tar bodies is kept below the point at which tar will distil and the temperature of the gas is kept above the point at which its contained water vapor will condense.

2. The process of removing tar from gas which consists in bringing the gas in successive contact with a series of tar bodies in the form of thin sheets and maintaining the temperature of the gas at a point above that at which water vapor will condense and below that at which tar will distil by directly controlling the temperature of the contacting tar bodies.

3. As a means of removing tar from gas the combination of a series of tar bodies, means for bringing the gas successively in contact with the tar bodies and means for independently regulating the temperature of the several tar bodies, substantially as set forth.

In testimony whereof, we have hereunto subscribed our names, this 21st day of January A. D., 1911.

WILLIAM H. BLAUVELT.
CHARLES G. TUFTS.
CLARKSON A. COLLINS.

Witnesses:
 EDWIN M. HUESTIS,
 A. F. B. BROWN.